United States Patent [19]
Otaki

[11] Patent Number: 5,729,132
[45] Date of Patent: Mar. 17, 1998

[54] MAGNETOELECTRIC CONVERSION DEVICE

[75] Inventor: Teruhiko Otaki, Nagano, Japan

[73] Assignee: Sankyo Seiki Mfg. Co., Ltd., Nagano-ken, Japan

[21] Appl. No.: 621,229

[22] Filed: Mar. 25, 1996

[30] Foreign Application Priority Data

Mar. 30, 1995 [JP] Japan .................. 7-073624

[51] Int. Cl.$^6$ .................. G01R 33/06; G01B 7/14; H03K 17/90; H03K 19/18
[52] U.S. Cl. .................. 324/207.21; 324/252; 338/32 R
[58] Field of Search .................. 324/207.21, 207.2, 324/207.25, 207.24, 174, 251, 252; 338/32 R, 32 H

[56] References Cited

U.S. PATENT DOCUMENTS

| | | |
|---|---|---|
| 5,047,716 | 9/1991 | Katagiri . |
| 5,243,280 | 9/1993 | Kusumi .................. 324/207.21 |
| 5,422,569 | 6/1995 | Nakahara et al. .................. 324/174 |
| 5,453,684 | 9/1995 | Nakayama .................. 324/207.12 |

FOREIGN PATENT DOCUMENTS

| | | |
|---|---|---|
| 63-132312 | 8/1987 | Japan . |
| 63-21060 | 2/1988 | Japan . |
| 63-63912 | 2/1988 | Japan . |

Primary Examiner—Walter E. Snow
Attorney, Agent, or Firm—McAulay Fisher Nissen Goldberg & Kiel, LLP

[57] ABSTRACT

A magnetoelectric conversion device comprises a magnetic recording medium magnetized with a repetitive signal in N and S poles that occur alternately at certain intervals and wherein said repetitive signal has a predetermined wavelength $\lambda$. A magnetic sensor, facing said magnetic recording medium. The magnetic sensor changes its resistivity according to the magnetic flux of said magnetic signals. The magnetic sensor has a first current path and a second current path connected in series and forming at least one interconnect. An output terminal is connected to each interconnect. A terminal of a power source is connected to both ends of each current path. Each of the current paths comprises two unitary segments and a plurality of magnetic resistor elements formed by turning a magnetic resistance strip n times (where n is an integer of 0 and greater). The first current path comprises a third unitary segment and a fourth unitary segment. The third unitary segment comprises a magnetic resistance element. One end of the magnetic resistance element is connected to a terminal of a power source and the other end is connected to the fourth unitary segment and another magnetic resistance element, one end of which is connected to an output terminal while the other end is connected to the fourth unitary segment is spaced from the third unitary segment by $\lambda/2$ and positioned in the middle of the first unitary segment and the second unitary segment.

5 Claims, 4 Drawing Sheets

MAGNETOELECTRIC CONVERSION DEVICE

BACKGROUND OF THE INVENTION a) Field of the Invention

This invention relates to a magnetoelectric conversion device used for detecting a repetitive signal magnetized in N and S, poles that occur alternately at certain intervals.

b) Description of the Related Art

A magnetoelectric conversion device that detects the position or speed of a rotor in the vicinity of a motor of various kinds is known. For example, in U.S. Pat. No. 5,047,716, a technology related to patterning of a magnetic sensor is disclosed. This technology employs a configuration wherein the outside two magnetic resistance elements are spaced by $\lambda/4$, and where there are magnetic resistance elements for cancelling which are spaced by $\lambda/4$ on each side of the magnetic resistance elements.

However, in this patterning, the line width of the entire sensor becomes extremely wide and it is difficult to apply the width to the elements on smaller IC chips.

For this reason, the patterning illustrated in FIG. 7 was proposed in Japanese Utility Model laid open 63-132312. In FIG. 7, magnetic resistance elements (hereafter referred to as MR element) R 1-1 and R 1-2 are spaced by $\lambda/2$ and are adjacent and parallel. They are connected in series to constitute a current path.

Nonetheless, in the patterning illustrated in FIG. 7, it is possible to make the total width comparatively narrow. However, in each current path, the interconnects between MR elements R 1-1, R 1-2 and that between MR elements R 2-1, R 2-2 cross over as marked by X in the figure. To cross an interconnect to mutually avoid shorting each other, it is required to form a plurality of interconnect pattern layers. This makes its manufacturing extremely difficult, greatly increasing the cost of manufacturing the product.

OBJECTS AND SUMMARY OF THE INVENTION

This invention is directed to resolving the problem of the conventional technology mentioned above to provide a magnetoelectric conversion device having a minimum sensor area and a stable signal output, which can be manufactured at a low cost. As used herein, the term magnetoelectric has the same meaning as the term magnetoresistive.

In accordance with the invention, a magnetoelectric conversion device comprises a magnetic recording medium magnetized with a repetitive signal in N and S poles that occur alternately at certain intervals and wherein said repetitive signal has a predetermined wavelength $\lambda$. A magnetic sensor, facing said magnetic recording medium. The magnetic sensor changes its resistivity according to the magnetic flux of said magnetic signals. The magnetic sensor has a first current path and a second current path connected in series and forming at least one interconnect. An output terminal is connected to each interconnect. A terminal of a power source is connected to both ends of each current path. Each of the current paths comprises two unitary segments and a plurality of magnetic resistor elements formed by turning a magnetic resistance strip n times (where n is an integer of 0 and greater). The first current path comprises a third unitary segment and a fourth unitary segment. The third unitary segment comprises a magnetic resistance element. One end of the magnetic resistance element is connected to a terminal of a power source and the other end is connected to the fourth unitary segment and another magnetic resistance element, one end of which is connected to an output terminal while the other end is connected to the first unitary segment is spaced from the third unitary segment by $\lambda/2$ and positioned in the middle of the first unitary segment and the second unitary segment.

DESCRIPTION OF THE PREFERRED EMBODIMENTS

Figure 1:
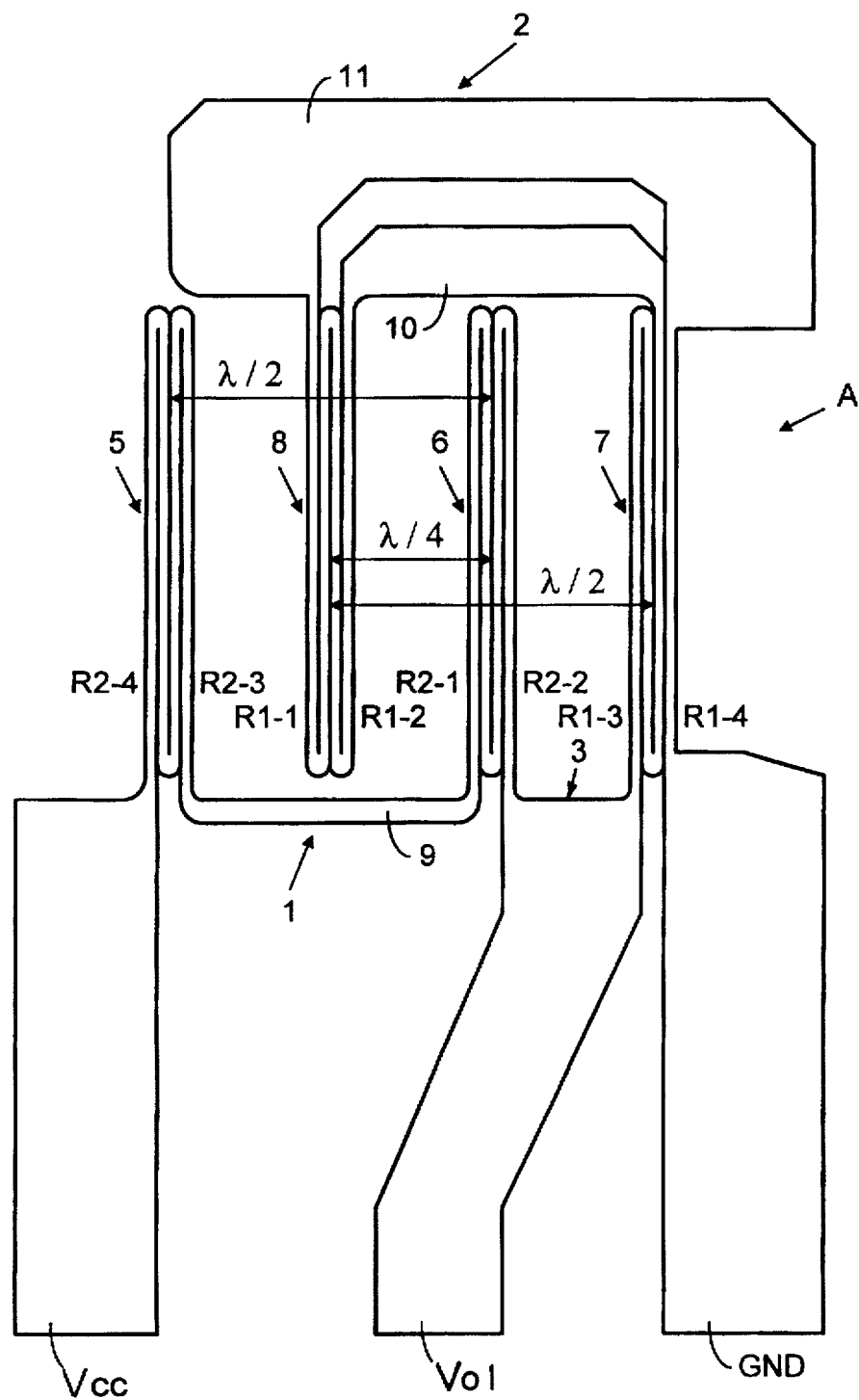
FIG. 1 illustrates an enlarged front view of the major components of a magnetic sensor which is a magnetoelectric conversion device of this invention.
Figure 2:
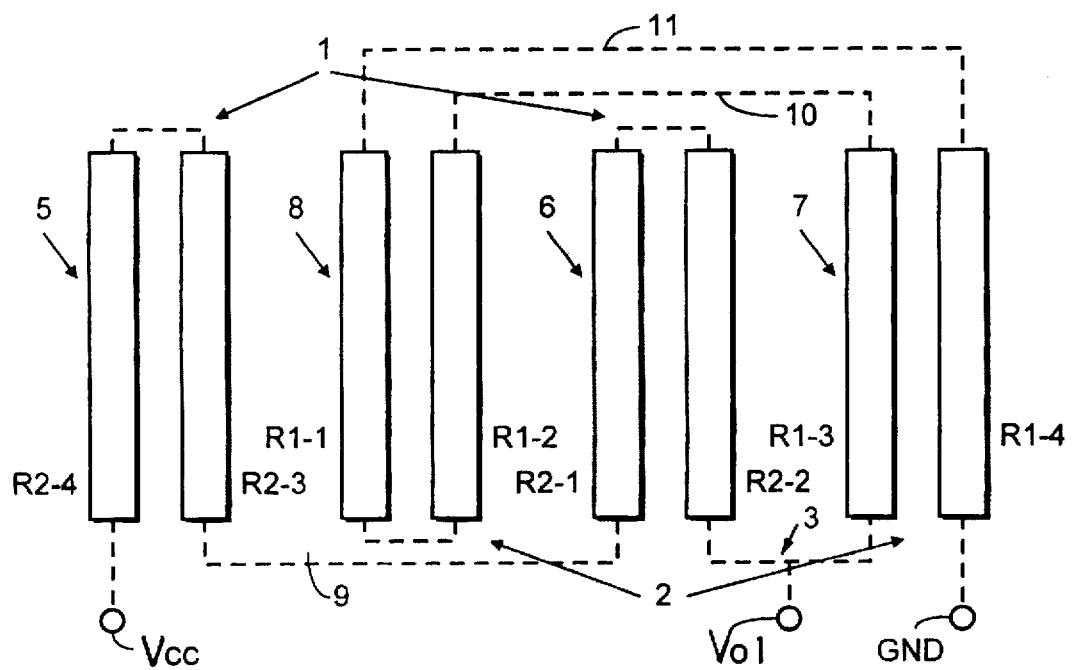
FIG. 2 illustrates the interconnect patterns of FIG. 1.
Figure 3:
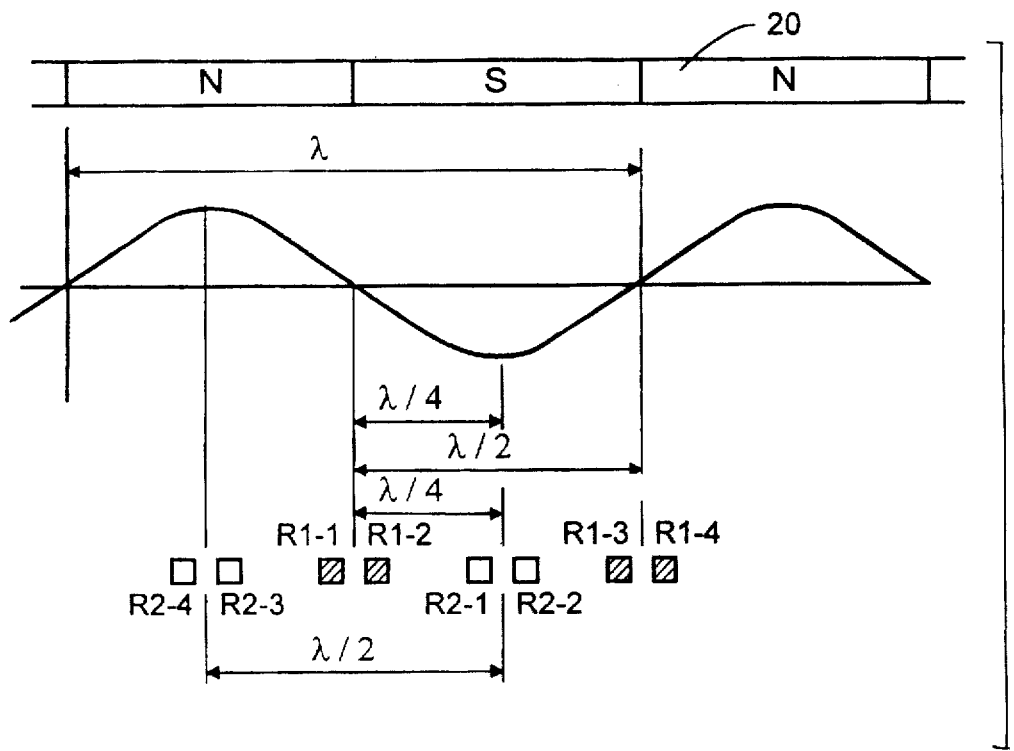
FIG. 3 illustrates a block diagram that shows the positional relationship according to the present invention between a magnetic sensor and a magnetic recording media.

An example of a magnetoelectric conversion device of this invention will be described below referring to the drawings. In FIGS. 1 and 3, a pattern is formed on a magnetic sensor A of the magnetoelectric conversion device using a thin Ni—Fe or Ni—Co layer of a magnetic resistor. the pattern comprises the first current path 1 and the second current path 2; both of them are connected in series with each other. One end of the first current path 1 and the second current path 2 are mutually connected by an interconnect 3; under the interconnect 3, at the lower section of the figure, is formed an output terminal, Vol. the other end of the first current path 1 is connected to Vcc, which is a terminal of a power source; the other end of the second current path 2 is connected to a grounding terminal GND, which is the second terminal of a power source.

When the predetermined wavelength of a cycle of a magnetic signal input is $\lambda$ and where the magnetic signal is magnetized on a magnetic recording medium (see the code 20 in FIG. 3) mounted on a motor side is $\lambda$, the first current path 1 comprises two unitary segments 5, 6 which are spaced by $\lambda/2$. the first unitary segment 5 is constructed by series-connecting MR elements R 2-3, R 2-4 formed by turning an MR strip in a hair pin shape and arranging the elements in parallel. the second unitary segment 6 is also constructed by connecting, in series, MR elements R 2-1, R 2-2 formed by turning an MR strip in a hair pin shape and arranging the elements to be adjacent and in parallel. Both first unitary segment 5 and the second unitary segment 6 have four MR strips and at the same time, are mutually connected via the first interconnect 9 to constitute the first current path 1.

Similarly, the second current path 2 also comprises two unitary segments 7 and 8 spaced by $\lambda/2$. the third unitary segment 7 comprises an MR element R 1-3 formed by means of turning an MR resistance strip n times (where n is the positive odd number, 3) in a hair pin shape and an MR element R1-4 comprised, adjacent and in parallel with a MR element R 1-3, of an MR strip without turning the MR strip (with 0 times turning.) Moreover, the fourth unitary segment 8 is constructed by connecting, in series, MR elements R 1-1, R 1-2 formed by the hair pin turns in the aforementioned MR strip and arranging them adjacent and in parallel.

In the third unitary segment 7, the MR element R 1-3 is not directly connected to the adjacent MR element R 1-4 but is connected to the MR element R 1-2 via the second interconnect 10. In addition, the MR element R 1-4 is connected to the MR element R 1-1 of the fourth unitary segment 8 via the third interconnect 11. As a result, the MR element R 1-3 that constitutes the third unitary segment 7 and the MR element R 1-4 are connected to both ends of the fourth unitary segment 8.

Figure 4:
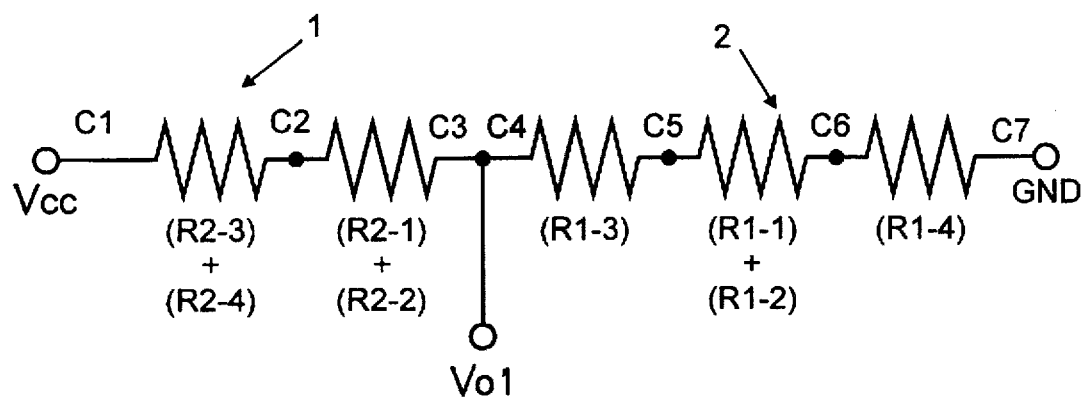
FIG. 4 illustrates an equivalent circuit for electrical connections of the aforementioned example shown in FIGS. 1–3.

In addition, in the middle of the first unitary segment 5 and the second unitary spaced by $\lambda/2$, that is, at the position spaced by $\lambda/4$ from the unitary segments 5 and 6 formed is the unitary segment 8. Moreover, in the middle of the third unitary segments 7 and the fourth unitary segment 8, that is, at the position spaced by $\lambda/4$ from the unitary segment 7 and 8, the second unitary segment 6 is formed. The total width (the width between the first unitary segment 5 and the third unitary segment 7) is about $3\lambda/4$. Furthermore, the length and the width of each MR elements R 1-1 . . . R 2-4, which constitute each unitary segments 5, 6, 7, 8, are predetermined; as a result, the resistivity at each of the MR elements is predetermined. For this reason, as illustrated in FIG. 4, the resistivity of interconnects C1 . . . C7 of each MR elements is predetermined in the first current path 1 and the second current path 2: (R 2-3)+(R 2-4)+(R 2-1)+(R 2-2)=(R 1-3)+(R 1-1)+(R 1-2)+(R 1-4).

Moreover, as illustrated in FIG. 1, the number of MR strips in each MR element R 1-1 . . . R 2-4 is: R 1-1=2; R 1-2=2; R 1-3=3; R 1-4=1 (No turn); R 2-1=2; R 2-2=2; R 2-3=2; R 2-4=2. In total, there are 16 turns, providing an even number of strips. For most MR elements, the number of turns is 2, providing an even number of elements strips. However, for MR elements R 1-3 and R 1-4 which constitute the third unitary segment 7 and also which are not connected directly but via the fourth unitary segment 8, the number is different. For the MR element R 1-3, the number of turns is 3; for the MR element R 1-4, the number of turns is 1. Those numbers are odd numbers.

As described above, according to the aforementioned magnetic sensor A, the first current path 1 comprises the first unitary segment 5 and the second unitary segment 6; the second current path comprises the third unitary segment 7 and the fourth unitary segment 8. In addition, the first unitary segment 5 comprises MR elements R 2-3, R 2-4; the second unitary segment 6 comprises MR elements R 2-1, R 2-2; the third unitary segment 7 comprises MR elements R 1-3 and R 1-4; the fourth unitary segment 8 comprises MR elements R 1-1, R 1-2. Also, on the first current path 1, the unitary segments 5, 6 are spaced by $\lambda/2$; MR elements R 2-1, R 2-2 and R 2-3, R 2-4 which constitute the unitary segments 5 and 6 are mutually arranged to be adjacent and in parallel. Moreover, the second current path 2 comprises the fourth unitary segment 8 formed by connecting MR elements R 1-1 and R 1-2 and the third unitary segment 7 which comprises MR elements R 1-3, R 1-4, the third unitary segment 7 and the fourth unitary segment 8 are spaced at a $\lambda/2$; in the middle, by $\lambda/4$, of the third unitary segment 7 and the fourth unitary segment 8, is located the second unitary segment 6 of the first current path 1.

This pattern designing eliminated patterns crossing over and it makes the normal thin layer fabrication process cost effective.

Figure 7:
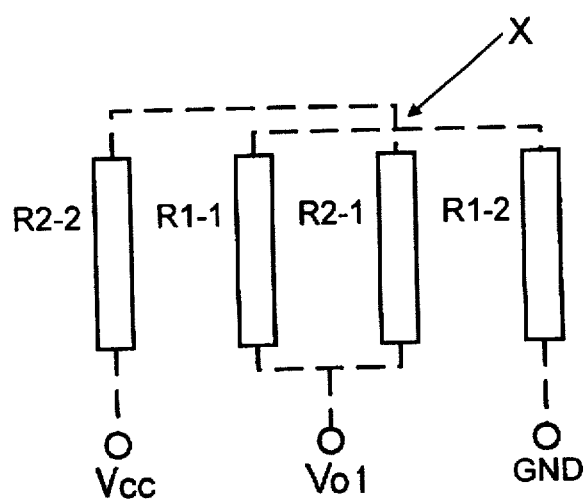
FIG. 7 illustrates a pattern illustrating an example of a magnetic sensor which is a conventional magnetoelectric conversion device.

In addition, the width occupied by the pattern can be reduced to $3/5$ of the width occupancy as illustrated in FIG. 7, thus the pattern can be applied to smaller IC chips. Especially, when the magnetic sensor A of this invention is used for a motor with a relatively small rotor diameter, for example used for a magnetic sensor for a capstan motor for a 8 mm VCR, it will contribute greatly to the miniaturization of the motor.

Furthermore, the first unitary segment 5, spaced by $\lambda/2$ in respect to the second unitary segment 6, and the third unitary segment 7, spaced by $\lambda/2$ in respect to the fourth unitary segment 8, react to each other as "cancel patterns": the magnetic flux the unitary segments 6, 8 generate will be opposite in phase in respect to the magnetic flux the unitary segments 5, 7 generate, as a result, the influence from the hysteresis effect is canceled and an accurate signal output can be obtained. Even if a large fluctuation is observed in the history of rate of change in magnetic resistance, a constant signal output can be obtained, canceling the motor wow flutter and the like.

Figure 5:
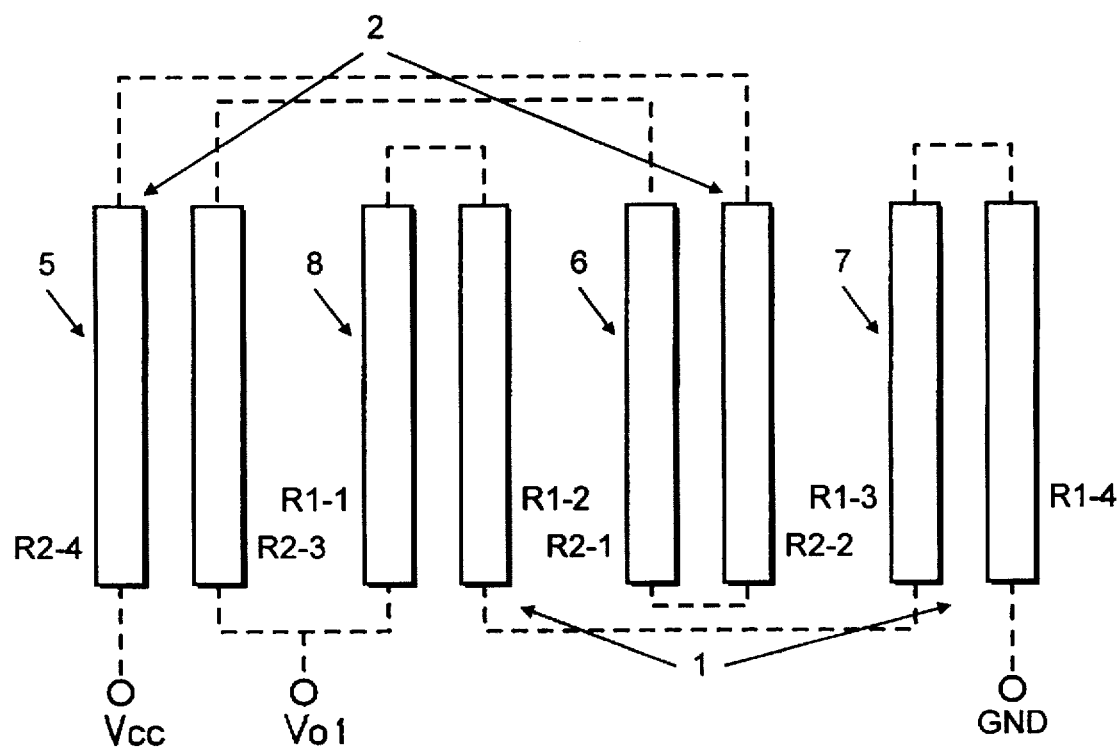
FIG. 5 shows a pattern illustrating another example of a magnetic sensor which is a magnetoelectric conversion device of this invention.

As illustrated in FIG. 5, the first current path 1 and the second current path 2 connections may be switched while maintaining the positioning of each of the MR elements. That is, on the first current path 1 side, MR elements R 1-3, R 1-4 are connected in series to constitute the first unitary segment 7; MR elements R 1-1, R 1-2 are connected in series to constitute the second unitary segment 8, then these unitary segments 7, 8 are connected in series. Further, at one end of the MR element R 1-4, a grounding terminal GND is connected; on the other end of the MR element R 1-1, an output terminal Vol is connected.

On the other hand, on the second current path 2 side, at both ends of MR elements R 2-1, R 2-2 connected in series, which constitute the fourth unitary segment 6, MR elements R 2-3, R 2-4 which constitute the third unitary segment 5 are connected. Then, at one end of the MR element R 2-3, the output terminal Vol is connected; at one end of the MR element R 2-4, a current supply terminal, Vcc is connected.

In this status, the first unitary segment 7 and the second unitary segment 8 are spaced by $\lambda/2$; in the middle, the fourth unitary segment 6 is positioned; the third unitary segment 5 is spaced from the fourth unitary segment 6 by $\lambda/2$.

And, with the above configuration, as in the aforementioned example, patterns of the first and the second current path do not cross each other. The pattern designing allows the conventional thin film fabrication process to be applied, thus lowering the manufacturing cost. In addition, the width a strip occupies can be, as in the aforementioned example, reduced to $3/5$ of that illustrated in FIG. 7. This makes it possible to apply the pattern on comparatively small IC chips. Furthermore, the third unitary segment 5 arranged spaced by $\lambda/2$ in respect to the fourth unitary segment 6; the first unitary segment 7 spaced by $\lambda/2$ in respect to the second unitary segment 8, two unitary segments providing output opposite in phase, which may be referred to as "canceled patterns." As a result, the influence from the hysteresis effect is canceled and an accurate signal output can be obtained. Even if a large fluctuation is observed in the history of rate of change in magnetic resistance, a constant signal output can be obtained, canceling the motor wow flutter and the like.

This invention has been described referring to an example, but this does not limit the scope of this invention.

Various changes and modifications may be made without departing from the invention.

Figure 6:
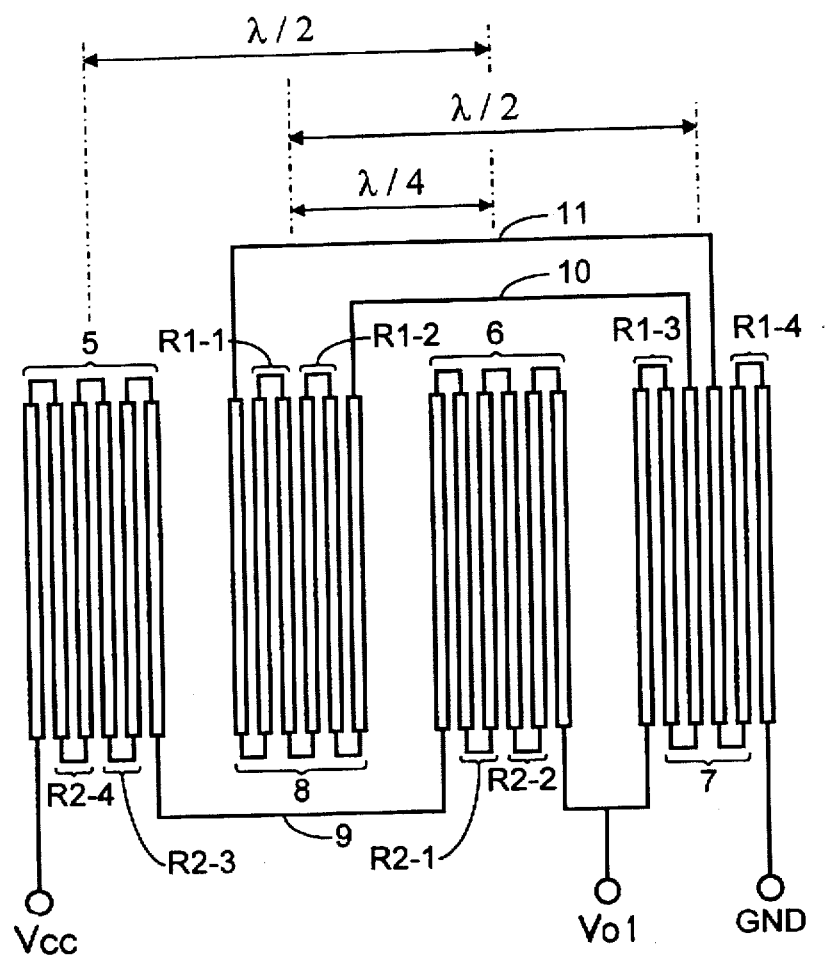
FIG. 6 shows a pattern illustrating another example of a magnetic sensor which is a magnetoelectric conversion device of this invention.

For example, in each of above mentioned examples, each unitary segment comprises four MR strips, however, as illustrated in FIG. 6, each unitary segment can be configured with 6 MR strips. In this configuration, every MR elements R 1-1, ... R 2-4 comprises 3 MR strips; two pairs of MR elements in the vicinity form total of four unitary segments from the first through fourth. This can be as effective as the aforementioned example, because the first current path and the second current path do not cross each other.

This invention, with the aforementioned configuration, provides that the first current path and the second current path do not cross each other. This makes it possible to provide a magnetoelectric conversion device that reduces manufacturing cost as low as possible. In addition, the width occupied by a magnetic sensor can be reduced and this makes it possible to apply the detector to smaller elements. Furthermore, in the first and the second current path, two unitary segments of each current path are spaced with a distance of $\lambda/2$ wherein one unitary segment reacts with the other unitary segment as a cancel pattern wherein said two unitary segments provide an accurate output which is opposite in phase to each other, thus canceling the influence of the hysteresis effect. As a result, even if a large fluctuation is observed in the history of rate of change in magnetic resistance, a constant signal output can be obtained.

What is claimed is:

1. A magnetoelectric conversion device comprising:

a magnetic recording medium magnetized with a repetitive signal in N and S poles that occur alternately at certain intervals and wherein said repetitive signal has a predetermined wavelength $\lambda$;

a magnetic sensor, facing said magnetic recording medium, changing its resistivity according to the magnetic flux of said magnetic signals;

wherein said magnetic sensor has a first current path and a second current path connected in series and forming at least one current path interconnect; an output terminal is connected to each current path interconnect while a terminal of a power source is connected to both ends of each current path;

each of said current paths comprising two unitary segments and a plurality of magnetic resistor elements formed by turning a magnetic resistance strip n times where n is an integer selected from integers of 0 and greater;

said first current path comprising a first unitary segment and a second unitary segment and each unitary segment being spaced by $\lambda/2$;

said second current path comprising a third unitary segment and a fourth unitary segment wherein the third unitary segment comprises a magnetic resistance element, one end of said magnetic resistance element being connected to a terminal of a power source and the other end being connected to the fourth unitary segment and another magnetic resistance element one end of which is connected to an output terminal while the other end is connected to the fourth unitary segment; the fourth unitary segment being spaced from the third unitary segment by $\lambda/2$ and positioned in the middle of said first unitary segment and said second unitary segment.

2. A magnetoelectric conversion device as claimed in chim 1 wherein:

one end of the first unitary segment is connected to a first terminal of a power source and the other end is connected to a second unitary segment;

one end of said second unitary segment is connected to an output terminal and the other end is connected to said first unitary segment;

the third unitary segment comprises a magnetic resistance element, one end of which is connected to the second terminal of a power source while the other end is connected to the fourth unitary segment, and another magnetic resistor element one end of which is connected to an output terminal and the other end is connected to said fourth unitary segment;

both ends of said fourth unitary segment being connected to the third unitary segment and each adjacent unitary segment is spaced by $\lambda/4$.

3. A magnetoelectric conversion device as claimed in claim 1 wherein:

each unitary segment is made up of m magnetic resistance strips where m is positive even number; the third unitary segment comprises two magnetic resistor elements constructed with n magnetic resistance strips where n is odd number; one end of a magnetic resistance element is connected to a terminal of a power source and the other end is connected to the fourth unitary segment; one end of the other magnetic resistance element is connected to an output terminal of a power source and the other end is connected to the fourth unitary segment.

4. A magnetoelectric conversion device as claimed in claim 1 wherein the total length of magnetic resistance elements in each unitary segment and their line widths are identical.

5. A magnetoelectric conversion device as claimed in claim 1 wherein the first unitary segment and the second unitary segment are connected via a first segment interconnect; the third unitary segment and the fourth unitary segment are connected via a second segment interconnect and a third segment interconnect.

* * * * *